US010239306B2

(12) United States Patent
Honda

(10) Patent No.: US 10,239,306 B2
(45) Date of Patent: Mar. 26, 2019

(54) METHOD FOR MANUFACTURING SLEEVE PRINTING PLATE

(71) Applicants: HONDA CARAX CO., LTD., Fukuoka-shi, Fukuoka (JP); D. I. ENGINEERING CORPORATION, Tokyo (JP)

(72) Inventor: Naoto Honda, Fukuoka (JP)

(73) Assignees: HONDA CARAX CO., LTD., Fukuoka (JP); D. I. ENGINEERING CORPORATION, Tokyo (JP)

( * ) Notice: Subject to any disclaimer, the term of this patent is extended or adjusted under 35 U.S.C. 154(b) by 107 days.

(21) Appl. No.: 15/120,620

(22) PCT Filed: Feb. 26, 2015

(86) PCT No.: PCT/JP2015/055535
§ 371 (c)(1),
(2) Date: Aug. 22, 2016

(87) PCT Pub. No.: WO2015/129785
PCT Pub. Date: Sep. 3, 2015

(65) Prior Publication Data

US 2017/0008269 A1 Jan. 12, 2017

(30) Foreign Application Priority Data

Feb. 27, 2014 (JP) ................................ 2014-036607

(51) Int. Cl.
*B29C 35/08* (2006.01)
*B41C 1/02* (2006.01)
(Continued)

(52) U.S. Cl.
CPC .................. *B41C 1/02* (2013.01); *B41C 1/05* (2013.01); *B41C 1/182* (2013.01); *B41F 17/22* (2013.01);
(Continued)

(58) Field of Classification Search
CPC .... B41N 1/22; B41N 3/00; B41C 1/02; B41C 1/05; B41C 1/182; B41F 17/22; B41F 27/1212
See application file for complete search history.

(56) References Cited

U.S. PATENT DOCUMENTS 7,364,032 B2 * 4/2008 Nisiguchi .......... B23Q 11/0057 198/495
7,709,183 B2 * 5/2010 Watanabe ................ B41C 1/00 101/212

FOREIGN PATENT DOCUMENTS

EP 1642715 A1 4/2006
JP 2007021898 A 2/2007
(Continued)

OTHER PUBLICATIONS

International Search Report dated Jun. 2, 2015 for PCT/JP2015/055535 and English translation.
(Continued)

*Primary Examiner* — Michael P Wieczorek
(74) *Attorney, Agent, or Firm* — Lucas & Mercanti, LLP

(57) ABSTRACT

Provided is a method for manufacturing a sleeve printing plate capable of forming an image pattern which applies printing on an object to be printed by laser engraving without generating cracks and chippings in a printing plate made of a photosensitive resin. The method for manufacturing a sleeve printing plate by making a printing plate made of a photosensitive resin surround an outer peripheral surface of a circular cylindrical sleeve body and forming an image pattern on the printing plate by laser engraving includes the steps of: washing and cooling the printing plate with water; applying heating treatment to the printing plate at a predetermined temperature; and applying heat radiation treatment to the printing plate after the heating treatment.

6 Claims, 5 Drawing Sheets

(51) Int. Cl.
*B41C 1/05* (2006.01)
*B41C 1/18* (2006.01)
*B41N 1/22* (2006.01)
*B41N 3/00* (2006.01)
*B41F 17/22* (2006.01)
*B41F 27/12* (2006.01)

(52) U.S. Cl.
CPC ............ *B41F 27/1212* (2013.01); *B41N 1/22* (2013.01); *B41N 3/00* (2013.01)

(56) References Cited

FOREIGN PATENT DOCUMENTS

JP 2010162879 A 7/2010
JP 2013091324 A 5/2013

OTHER PUBLICATIONS

Extended European Search Report dated May 23, 2017 from the corresponding European Patent Application No./Patent No. 15755875.0-1704 / 3112179 PCT/JP2015055535.

* cited by examiner

METHOD FOR MANUFACTURING SLEEVE PRINTING PLATE

CROSS REFERENCE TO RELATED APPLICATION

This Application is a 371 of PCT/JP2015/055535 filed on Feb. 26, 2015, which, in turn, claimed the priority of Japanese Patent Application No. JP2014-036607 filed on Feb. 27, 2014, both applications are incorporated herein by reference.

TECHNICAL FIELD

The present invention relates to a method for manufacturing a sleeve printing plate, and more particularly to a technique for manufacturing a sleeve printing plate which can print characters or an image pattern on a surface of a can barrel of a beverage can.

BACKGROUND ART

In general, as a printing device which prints a printing image on a surface of a can barrel of a beverage can, as described in patent literature 1, there has been used, for example, a device which applies printing to a cylindrical can barrel by rotating a resin-made printing plate wound around a peripheral surface of a cylindrical metal-made sleeve body.

A printing plate used in the printing device is used for flexographic printing which is one of letterpress printing methods which use liquid ink (water-based ink or UV ink). Recently, with the progress of laser engraving and printing technology, a printed relief (printing pattern) of high precision can be engraved on the printing plate and hence, a demand for the printing plate has been increasing.

As a raw material for a printing plate which enables direct plate making by laser graving, for example, a nylon-based plate-like photosensitive resin can be named. To use such a photosensitive resin as a raw material for a printing plate, first, it is necessary to cure the photosensitive resin by irradiating an ultraviolet ray to the photosensitive resin to give predetermined strength to the photosensitive resin. Then, the cured photosensitive resin is engraved by a $CO_2$ laser thus forming a printed relief (characters or an image pattern) to be printed on a can barrel.

Two plate-like printing plates having such a configuration are prepared, and these printing plates are wound around a peripheral surface of a cylindrical metal-made sleeve body thus forming a sleeve printing plate. Then, a plurality of sleeve printing plates are mountable on an outer peripheral surface of a cylinder of the printing device for inks of respective colors.

Then, the printing device temporarily transfers ink which follows the printed relief on the printing plate on a blanket formed in a circular cylindrical shape and, thereafter, ink is printed on the can barrel (so-called offset printing).

CITATION LIST

Patent Literature

PTL 1: JP-A-2010-162879

SUMMARY OF INVENTION

Technical Problem

However, in the above-mentioned printing plate, a photosensitive resin to which curing is applied using an ultraviolet ray has a tendency of forming cross-linking chains in layers within a thickness of the photosensitive resin. Accordingly, when the photosensitive resin is engraved by a strong $CO_2$ laser after exposure, the photosensitive resin is instantaneously heated and dried and hence, linking in a thickness direction where an amount of cross-linking chains is small is broken down whereby laminar cracks occur.

Such a defect is caused by the irradiation from an ultraviolet ray irradiation lamp from one direction which is irradiation on a flat plate state, mutual interference of lights or the like. Further, due to cross-linking during exposure, oxygen and the like which constitute raw materials of the photosensitive resin are discharged from the inside of the photosensitive resin and hence, a volume of the photosensitive resin is decreased or the photosensitive resin is shrunken. Eventually, a stress is generated in the photosensitive resin and the stress is released at the time of engraving the photosensitive resin. As a result, as shown in an enlarged view showing a portion of a sleeve printing plate 10 in FIG. 7, a crack H and a chipping K occur in a printed relief 13 of the printing plate after laser engraving. FIG. 7 is an explanatory view showing the structure of a printed relief on a sleeve printing plate according to the prior art in an enlarged manner.

Further, on a surface of a printing plate made of a general photosensitive resin, a layer referred to as "slip coat" is formed. Laser engraving is a plate making method in which engraving is performed using light energy and hence, when a thin film layer exists on a surface of a printing plate which is an object to be engraved, laser interference occurs unless a thickness of the layer is equal to a wavelength of the laser or is integer times as large as the wavelength of the laser so that the diffusion of laser occurs. Due to this diffusion of laser, the printing plate is heated and dried so that cracks occur in the printing plate.

The present invention has been made in view of the above-mentioned circumstances, and it is an object of the present invention to provide a method for manufacturing a sleeve printing plate capable of forming an image pattern which applies printing on an object to be printed by laser engraving without generating cracks and chippings in a printing plate made of a photosensitive resin.

Solution to Problem

To overcome the above-mentioned drawbacks, in the present invention described in claim 1, in a method for manufacturing a sleeve printing plate by making a printing plate made of a photosensitive resin surround an outer peripheral surface of a circular cylindrical sleeve body and forming an image pattern on the printing plate by laser engraving, the method includes the steps of: washing and cooling the printing plate with water; applying heating treatment to the printing plate at a predetermined temperature; and applying heat dissipation treatment to the printing plate after the heating treatment.

The present invention described in claim 2 is, in the present invention described in claim 1, characterized in that the method further includes a step of forming the printing plate into a circular cylindrical shape and performing exposure by irradiating an ultraviolet ray to the printing plate so as to cure the photosensitive resin before the step of washing and cooling the printing plate with water.

The present invention described in claim 3 is, in the present invention described in claim 1 or 2, characterized in that the heating treatment and the heat dissipation treatment are performed while holding the sleeve printing plate in a circular cylindrical shape having a diameter approximately equal to the diameter of the printing plate in a state where the sleeve printing plate is mounted on a laser engraving device or a printing device.

Advantageous Effects of Invention

According to the present invention called for in claim 1, although a protective layer referred to as "slip coat" is formed on a printing plate made of a general photosensitive resin, the slip coat can be peeled off with water washing. By peeling off the slip coat, it is possible to prevent the occurrence of laser interference and laser diffusion. It is also possible to suppress heating and drying of the printing plate or the occurrence of cracks caused by laser interference and laser diffusion.

Due to heating treatment and heat dissipation treatment, it is possible to acquire an advantageous effect that the inside of the printing plate is activated, particularly, cross-linking in a thickness direction is accelerated so that the mesh-like cross-linking structure is formed and, at the same time, the cross-linking structure having strong resistance against heat of laser can be formed.

According to the present invention called for in claim 2, by performing the exposure in a circular cylindrical shape which is the same shape adopted at the time of engraving and at the time of printing and hence, curing is performed such that a stress is minimally generated in the inside of the printing plate whereby it is possible to acquire an advantageous effect that the occurrence of cracks and chippings in a printed relief after laser engraving can be reduced.

According to the present invention called for in claim 3, the heating treatment and the heat dissipation treatment are performed while holding the printing plate in a circular cylindrical shape having a diameter approximately equal to the diameter of the sleeve printing plate in a state where the sleeve printing plate is mounted on a laser engraving device or a printing device. Accordingly, heating treatment can be applied to the printing plate in a state substantially equal to a state where laser graving is performed or the printing plate is mounted on an actual printing device and hence, the mesh-like cross-linking structure can be formed and, at the same time, the printing plate can be a printing member which is considerably suitable for laser graving.

DESCRIPTION OF EMBODIMENTS

The present invention provides a method for manufacturing a sleeve printing plate including a printing plate made of a photosensitive resin which is disposed on an outer peripheral surface of a circular cylindrical sleeve body and enables the formation of an image pattern to be printed on an object to be printed (can barrel) by laser engraving, wherein the method is characterized by including the steps of: washing and cooling the printing plate with water; applying heating treatment to the printing plate at a predetermined temperature; and applying heat dissipation treatment to the printing plate after the heating treatment.

The present invention is also characterized in that, the method further includes a step of forming the printing plate into a circular cylindrical shape and performing exposure by irradiating an ultraviolet ray to the printing plate so as to cure the photosensitive resin before the step of washing and cooling the printing plate with water.

The present invention is also characterized in that the heating treatment and the heat dissipation treatment are performed while holding the sleeve printing plate in a circular cylindrical shape having a diameter approximately equal to the diameter of the printing plate in a state where the sleeve printing plate is mounted on a laser engraving device or a printing device.

That is, the present invention provides the method for manufacturing a sleeve printing plate which is characterized in that, an optimum printing plate can be manufactured after laser engraving by strengthening cross-linking in the printing plate used in a mode where the sleeve printing plate is mounted on a cylinder of an offset printing apparatus, and more particularly, by increasing such cross-linking in a thickness direction of the printing plate and, further, by creating a state where a dynamic stress does not remain in the printing plate.

(Manufacture of Sleeve Printing Plate)

One embodiment of the present invention is described with reference to drawings hereinafter.

Figure 1:
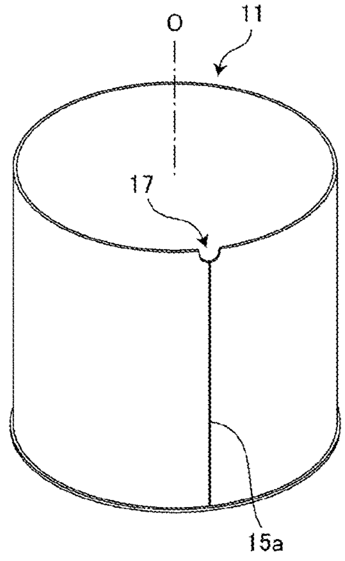
FIG. 1 is an explanatory view showing a sleeve body used in a method for manufacturing a sleeve printing plate according to an embodiment.
Figure 2:
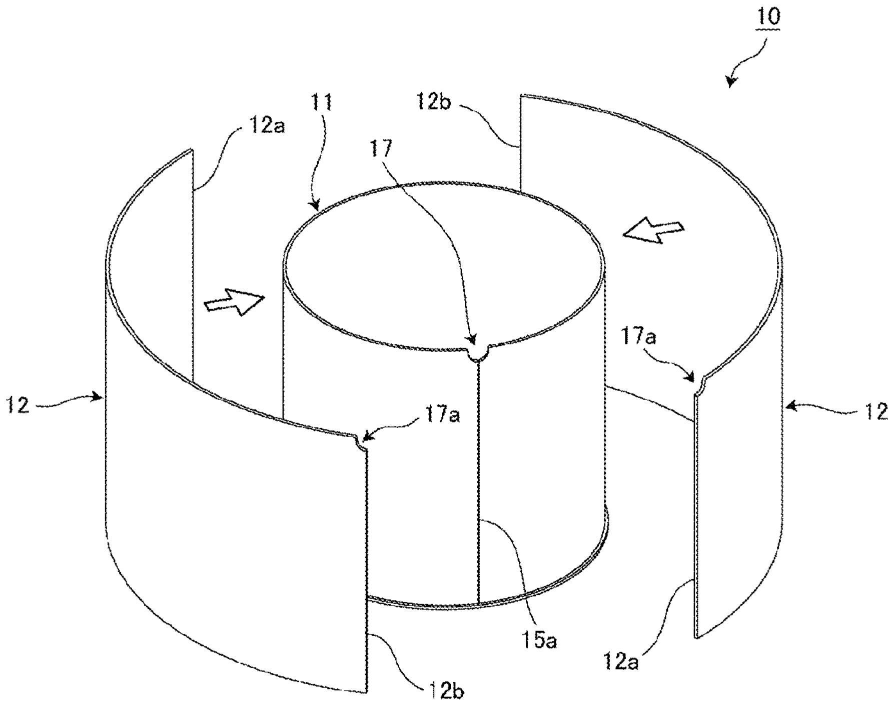
FIG. 2 is an exploded explanatory view showing the structure of the sleeve printing plate used in the method for manufacturing a sleeve printing plate according to the embodiment.

FIG. 1 is an explanatory view showing a sleeve body used in a method for manufacturing a sleeve printing plate according to an embodiment. FIG. 2 is an exploded explanatory view showing the structure of the sleeve printing plate used in the method for manufacturing a sleeve printing plate according to the embodiment.

As shown in FIG. 1 and FIG. 2, a sleeve printing plate 10 according to the embodiment includes: a circular cylindrical sleeve body 11 which extends along an axis O; and a printing plate 12 which is disposed on an outer peripheral surface of the sleeve body 11 and is made of a photosensitive resin capable of forming an image pattern 14 to be printed on an object to be printed by laser engraving.

Although a synthetic resin material may be used as a material for forming the sleeve body 11 provided that the synthetic resin material has high strength and is minimally deformed, the description is made in this embodiment with respect to the case where the metal-made sleeve body 11 is used.

The metal-made sleeve body 11 is literally made of metal, and a wall thickness t of the sleeve body 11 (shown in FIG. 3) is set to a fixed value in an axial (O) direction and in a circumferential direction. A joining portion **15*a* is formed on a portion of the metal-made sleeve body 11 in a circumferential direction as shown in FIG. 1 and FIG. 2. That is, the metal-made sleeve body 11** is formed by joining one end portion and the other end portion of a metal sheet material.

Further, on one end portion side of the joining portion 15*a* of the metal-made sleeve body 11, a positioning notched portion 17 for aligning relative position of the metal-made sleeve body 11 with a cylinder 51 of an offset printing apparatus A (shown in FIG. 4) described later is formed.

Figure 3:
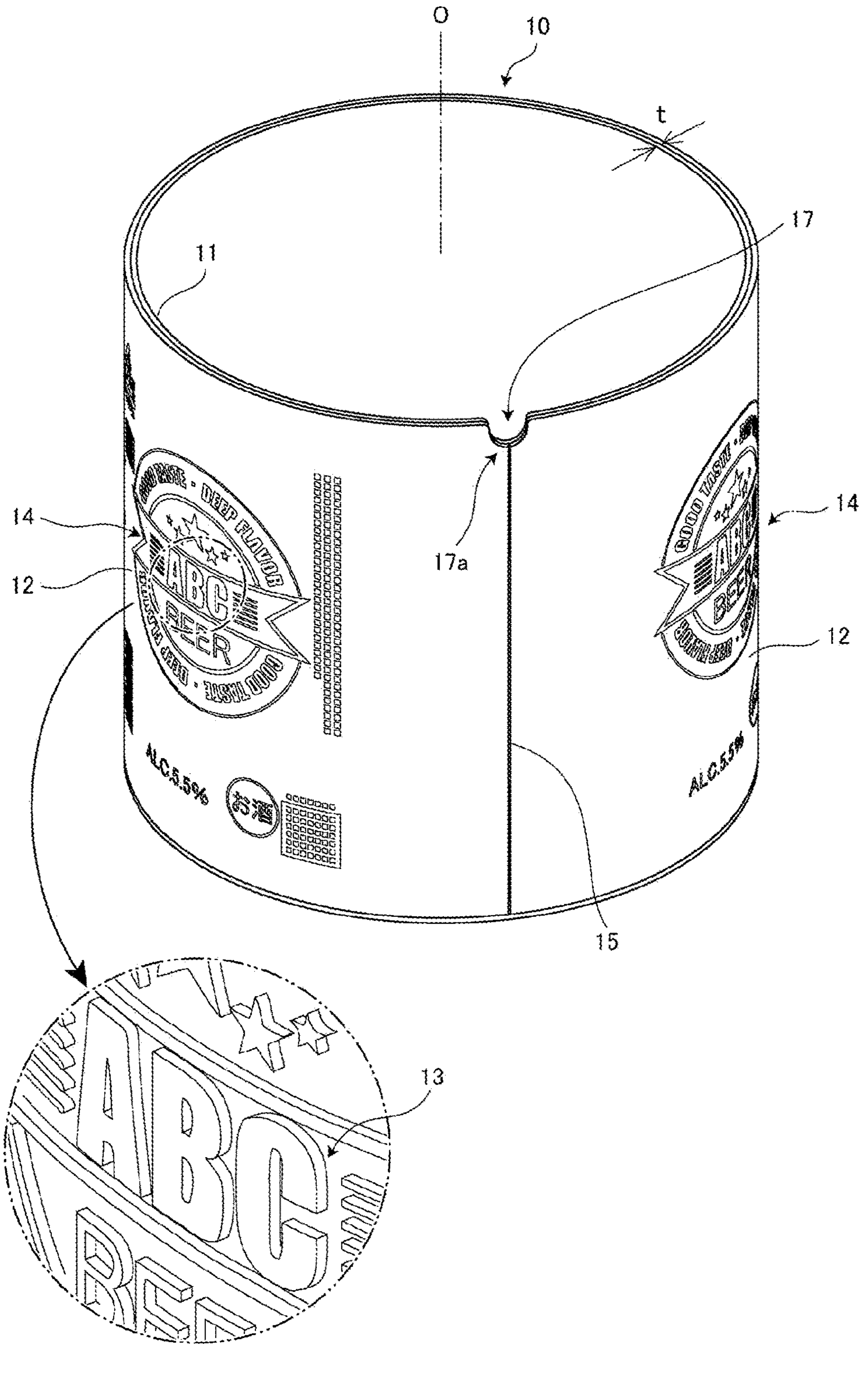
FIG. 3 is an explanatory view showing the structure of the sleeve printing plate of the embodiment to which laser engraving is applied.

FIG. 3 is an explanatory view showing the structure of the sleeve printing plate 10 of the embodiment to which laser engraving is applied. In the sleeve printing plate 10 shown in FIG. 3, on a peripheral surface of the printing plate 12 which surrounds the outer peripheral surface of the metal-made sleeve body 11, a drawing surface (printed relief 13 surface) on which image patterns 14, 14 to be printed on an object to be printed (can barrel) is formed by laser engraving is formed. In this embodiment, as shown in FIG. 3, the printing plate 12 is wound such that the image patterns 14, 14 having two printing surfaces are engraved at positions which opposedly face with each other with the axis O sandwiched therebetween.

That is, in this embodiment, as shown in FIG. 3, the respective image patterns 14, 14 are disposed at an interval of 180°, and the joining portion 15 and the positioning notched portion 17 are disposed on the peripheral surface between one image pattern 14 and the other image pattern 14.

A method for manufacturing the printing plate 12 used in the offset printing apparatus A (shown in FIG. 4) having such structure is described in detail with reference to FIG. 6.

(Manufacturing Method)

First, a plate-like photosensitive resin is prepared. As the photosensitive resin, for example, PRINTTIGHT made by TOYOBO is used. Components of the photosensitive resin are exemplified in following Table 1.

TABLE 1

| name of components | content (weight %) |
|---|---|
| polyurethane | 56 to 58 |
| derivatives of acrylate, methacrylate | 24 to 26 |
| plasticizer | 12 to 14 |
| photo-polymerization initiator and the like | 4 to 6 |
| methyl alcohol | <3 |
| methyl acrylate | <3 |
| methyl methacrylate | <3 |

Figure 6:
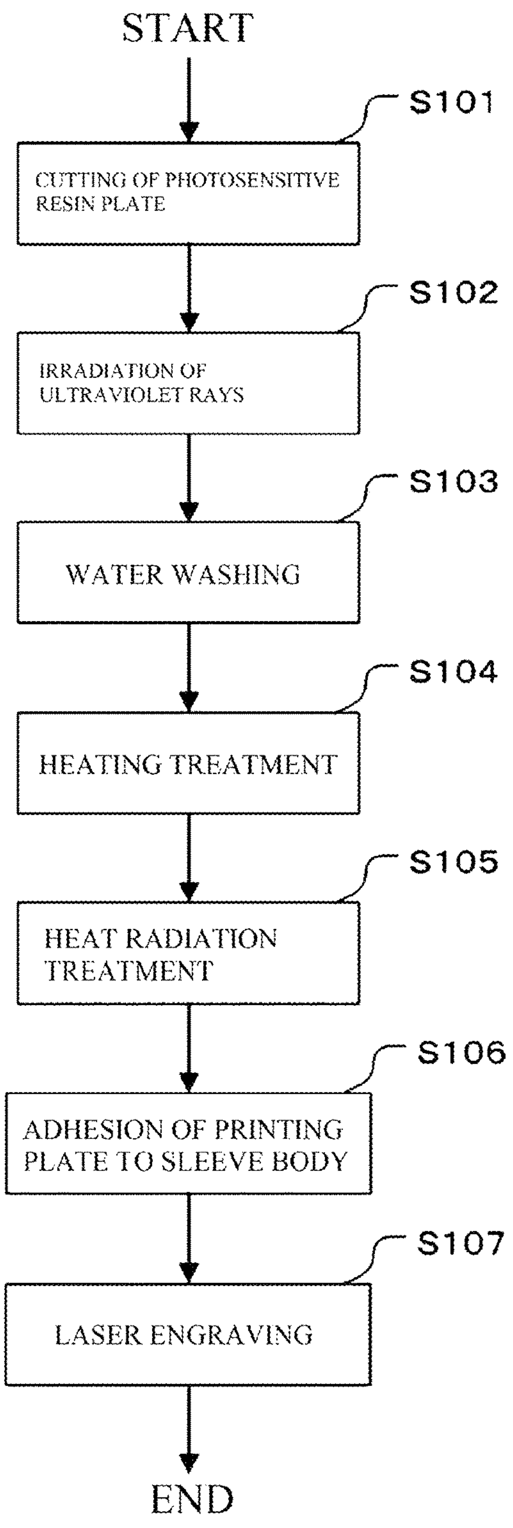
FIG. 6 is a flowchart showing the manufacture flow of a method for manufacturing a sleeve printing plate according to the embodiment.

An elongated sheet raw material made of such a photosensitive resin (not shown in the drawing) is cut into a predetermined length thus obtaining the printing plate 12 (S101 in FIG. 6). In performing such cutting, it is desirable to use an ultrasonic wave cutter. By performing the cutting using the ultrasonic wave cutter, a cut surface becomes smooth so that the joining after the cutting can be performed favorably.

(Exposure Treatment)

Figure 4:
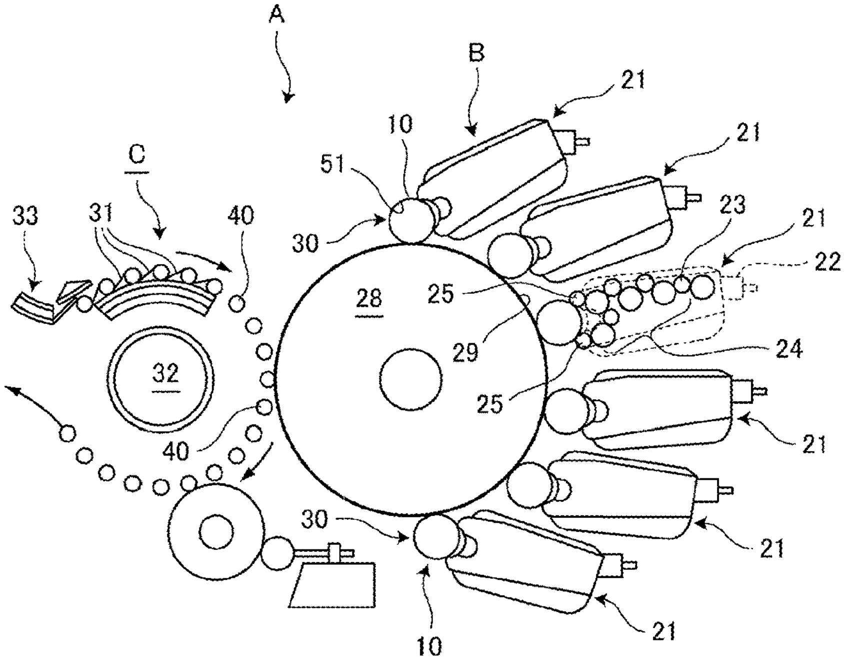
FIG. 4 is an explanatory view showing the structure of a printing device which uses the sleeve printing plate according to the embodiment.

The printing plate 12 obtained in this manner is wound in the same manner as a state where the printing plate 12 is mounted on the cylinder 51 of the offset printing apparatus A shown in FIG. 4, that is, is wound on a metal-made holder (not shown in the drawing) or the like having approximately the same diameter as the metal-made sleeve body 11.

Thereafter, an ultraviolet ray is irradiated to the photosensitive resin (S102 shown in FIG. 6). It is desirable that an ultraviolet ray which falls within a broad range of from 315 nm to 400 nm is irradiated to the photosensitive resin, and the photosensitive resin is cured with energy of 9600 mJ/cm$^2$ or more (in the case where the photosensitive resin has a thickness of 0.95 mm). When an ultraviolet ray is irradiated to the photosensitive resin, since the photosensitive resin contains an acrylate group, the photosensitive resin is cured.

In this embodiment, the circular cylindrical exposure is performed for curing the resin. That is, an unexposed photosensitive resin plate is wound on the holder in a circular cylindrical shape approximately in the same manner as a state where the resin plate is mounted on the offset printing apparatus A described later. Then, an ultraviolet ray is irradiated to the photosensitive resin wound in the circular cylindrical shape so as to cure the photosensitive resin.

In this manner, the circular cylindrical exposure aims at the prevention of the occurrence of a stress in the printing plate (resin plate) 12 as much as possibility by forming the photosensitive resin into a circular cylindrical shape at the time of forming cross-linking in the monomer in the same manner as at the time of printing and at the time of engraving. However, there is a possibility that a stress can be released by preforming only heating treatment described later depending on a case and hence, the circular cylindrical exposure is performed when necessary.

(Water Washing Treatment)

Next, water washing is performed immediately after the circular cylindrical exposure (S103 shown in FIG. 6). By performing such water washing, it is possible to prevent the printing plate 12 from being excessively dried. Water washing is performed also in a state where the printing plate is formed into a plate shape instead of a state where the printing plate 12 is wound in a circular cylindrical shape.

A layer referred to as "slip coat" (not shown in the drawing) is formed on the printing plate 12 made of a general photosensitive resin. Water washing aims at peeling off this layer. By peeling off the slip coat, the laser interference and the laser diffusion at the time of engraving can be reduced. Accordingly, it is possible to prevent heating and drying of the printing plate 12 and the occurrence of cracks in the printing plate 12 caused by the presence of the slip coat.

(Heating Treatment)

After water washing, hot air treatment is performed in an oven at a temperature of 135° C. to 170° C. (S104 shown in FIG. 6).

Hot air treatment (heating treatment) may be performed approximately for 3 minutes to 20 minutes, for example, although the treatment time differs depending on a size of the printing plat or capacity of a heating treatment machine. After heating treatment, heat dissipation treatment (natural cooling) is performed for a predetermined time (S105 shown in FIG. 6).

Heating treatment and heat dissipation treatment are performed in a state where the printing plate 12 is wound around a metal-made holder (not shown in the drawing) or the like having approximately the same diameter as the metal-made sleeve body 11. That is, it is desirable to perform heating treatment and heat dissipation treatment in a state where the printing plate 12 is wound in a circular cylindrical state which is substantially equal to a state where the printing plate 12 is mounted on a laser engraving device and a state where the printing plate 12 is mounted on the cylinder 51 of the offset printing apparatus A.

In this manner, in this embodiment, by applying heating treatment to the printing plate 12 in a state close to the use of the printing plate 12 in an actual offset printing apparatus A, activation treatment is applied to the printing plate 12. That is, by applying heating treatment in a mode where the printing plate 12 is used in the actual offset printing apparatus A, the inside of the printing plate 12 is activated so that cross-linking in a thickness direction of the printing plate 12 is accelerated particularly.

It is desirable that heat dissipation be performed slowly spending a time. Although the time may differ depending on a size and a thickness of the printing plate 12, it is desirable to perform heat dissipation for 5 minutes to 120 minutes, for example.

The composition of the photosensitive resin in an unexposed state differs depending on a resin maker. Although the nylon-based composition is formed by generating photo cross-linking by adding an additive to monomer of urethane, an aramid resin or the like, there is no possibility cross-linking chains are completely cross-linked with each other with mere photo cross-linking and the additive is not eliminated completely.

The method for manufacturing the sleeve printing plate 10 according to this embodiment has focused on this fact. According to the manufacturing method of this embodiment, by activating the inside of the printing plate 12 by heating the printing plate 12, and more particularly, by accelerating cross-linking in a thickness direction of the printing plate 12, it is possible to form the mesh-like cross-linking structure and, at the same time, the cross-linking structure which is strong also against heat of laser. Accordingly, the printing plate 12 according to this embodiment can be a plate member which is extremely suitable for laser engraving.

(Treatment after Heating and Heat Dissipation)

Through the heating step and the heat dissipation step, components in the printing plate 12 are discharged to the outside. Particularly, the components are coagulated on a periphery of the printing plate 12 and, more particularly, in an edge portion of the printing plate 12. Accordingly, when the printing plate 12 is used as a plate material, it is desirable to use the inside of the printing plate 12 obtained by cutting out from the periphery. In this case, the cut-out inner portion is used as the printing plate 12 to be mounted on the metal-made sleeve body 11.

Then, as shown in FIG. 2, two printing plates 12 which are already subjected to the above-mentioned treatments are prepared. One printing plate 12 and the other printing plate 12 are laminated to the peripheral surface of the metal-made sleeve body 11 by a double-side adhesive tape (not shown in the drawing) or the like, for example, at an interval of 180° (S106 shown in FIG. 6).

Thereafter, with respect to two printing plates 12 laminated to the peripheral surface of the metal-made sleeve body 11, an end portion 12*a* of one printing plate 12 and an end portion 12*b* of the other printing plate 12 may be joined to each other by laser welding. In this case, for example, $CO_2$ laser can be also irradiated to a contact portion between one end portion 12*a* and the other end portion 12*b* to which a laser absorbing agent, for example, is applied. In this case, one end portion 12*a* and the other end portion 12*b* of the printing plates 12 are welded to each other by being heated locally. By selecting the laser absorbing agent, it is possible to use a solid state laser or a semiconductor laser which can be handled more easily.

Further, the end portion 12*a* of one of two printing plates 12 and the end portion 12*b* of the other of two printing plates are brought into contact with each other or are made to partially overlap with each other, and an ultrasonic wave can be applied to the end portion 12*a* of one printing plate 12 and the end portion 12*b* of the other printing plate 12 by bringing a probe (not shown in the drawing) of an ultrasonic wave oscillator (not shown in the drawing) to the end portion 12*a* of one printing plate 12 and the end portion 12*b* of the other printing plate 12. As a result, the end portion 12*a* of one of two printing plates 12 and the end portion 12*b* of the other of two printing plates 12 are locally heated by friction heat generated by an ultrasonic wave and are welded to each other.

Next, on one end portion side of the joining portion 15, at a position substantially equal to the position of the positioning notched portion 17 formed on the metal-made sleeve body 11, a notched portion 17*a* having substantially the same shape as the positioning notched portion 17 is formed. It is desirable that the notched portion 17*a* formed in the joining portion 15 of the printing plate 12 be formed such that at least the positioning notched portion 17 of the metal-made sleeve body 11 is completely exposed.

The sleeve printing plate 10 having the joining portion 15 is prepared in this manner. The prepared sleeve printing plate 10 may be formed as a product which can be shipped to a dealer which performs laser engraving.

Figure 7:
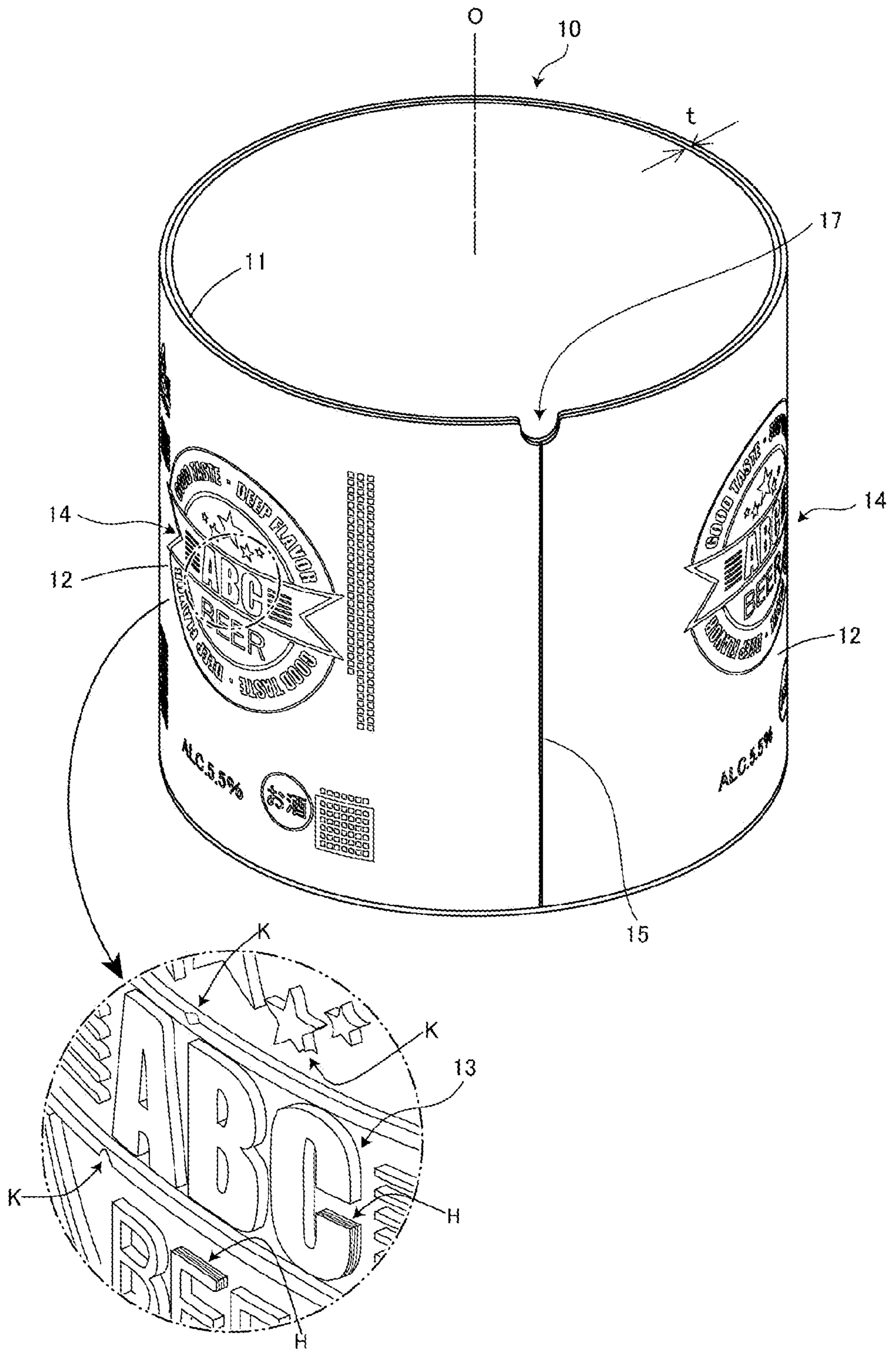
FIG. 7 is an explanatory view showing the structure of a printed relief on a screen printing plate according to the prior art.

As has been described heretofore, the printing plate 12 obtained by the manufacturing method according to this embodiment can decrease cracks H and chippings K shown in FIG. 7 as much as possible and hence, it is possible to obtain a print member which exhibits extremely high compatibility with laser engraving.

The sleeve printing plate 10 according to this embodiment is configured such that the printing plate 12 made of a photosensitive resin can be removed from the metal-made sleeve body 11. With such a configuration, when the printing plate 12 is degraded, the degraded printing plate 12 is removed and the new printing plate 12 is mounted on the metal-made sleeve body 11 so that the sleeve printing plate 10 can be configured to be engraved by laser and hence, the sleeve printing plate 10 can be regenerated.

(With Respect to Laser Engraving)

Next, a laser engraving method of the sleeve printing plate 10 is described.

Laser beam is irradiated to an outer peripheral surface of the sleeve printing plate 10 obtained in the above-mentioned manner by a laser working machine (not shown in the drawing) thus forming a printed relief 13 (letterpress) which forms image patterns 14, 14 (S107 shown in FIG. 6).

In this embodiment, as shown in FIG. 3, as described previously, two image patterns 14, 14 are disposed at positions which opposedly face each other with an axis O sandwiched therebetween. Further, the circumferential positions of these image patterns of 14, 14 are adjusted such that the image patterns 14, 14 are away from each other by 90° in the circumferential direction with respect to the joining portion 15. Printed reliefs 13 of the image patterns 14, 14 are formed such that the printed reliefs 13 project more outwardly in the radial direction than the joining portion 15*a*.

In this manner, as shown in FIG. 3, according to the manufacturing method of the printing plate 12 according to this embodiment, even after laser graving, it is possible to obtain the printing plate 12 having the printed relief 13 which includes the least number of cracks and chippings.

(Description of Offset Printing Apparatus)

Next, a use example of the sleeve printing plate 10 after laser engraving is described.

The sleeve printing plate 10 according to this embodiment is used in the offset printing apparatus A for a can where printing is applied to an outer peripheral surface of a circular cylindrical can.

FIG. 4 is an explanatory view showing the structure of the offset printing apparatus A (for example, Concord Decorator) to which the sleeve printing plate 10 of the present invention is applied. The offset printing apparatus A is substantially formed of: ink adhesion mechanisms B disposed at a plurality of positions; and a can moving mechanism C.

The ink adhesion mechanism B is formed of: inker units 21 for suppling inks; and a blanket wheel 28 having a plurality of blankets 29 which are brought into contact with the inker units 21 so as to receive ink from the inker units 21 and, thereafter, are brought into contact with an outer peripheral surface of the can barrel 40 so as to print (adheres) inks onto the outer peripheral surface of the can barrel 40.

The inker unit 21 is formed of: an ink source 22; a ducting roll 23 which is brought into contact with the ink source 22 so as to receive an ink from the ink source 22; an intermediate roller 24 which is connected to the ducting roll 23 and is formed of a plurality of rollers; a rubber roller 25 which is connected to the intermediate roller 24; and a plate cylinder 30 which is connected to the rubber roller 25. A sleeve printing plate 10 equipped with image patterns 14, 14 is configured to be mountable on an outer peripheral surface of the plate cylinder 30.

The plurality of blankets 29 are disposed on an outer peripheral surface of the blanket wheel 28. The blankets 29 are configured to be brought into contact with the printed reliefs 13 of the sleeve printing plates 10 disposed on the outer peripheral surfaces of the plate cylinders 30 and to be brought into contact with the can barrels 40.

The can moving mechanism C is formed of: a can chuter 33 which receives the can barrel 40; a mandrel 31 which rotatably holds the can barrel 40 supplied from the can chuter 33; and a mandrel turret 32 which sequentially rotatably moves the can barrels 40 mounted on the mandrel 31 in a direction toward an ink adhesion mechanism B.

Figure 5:
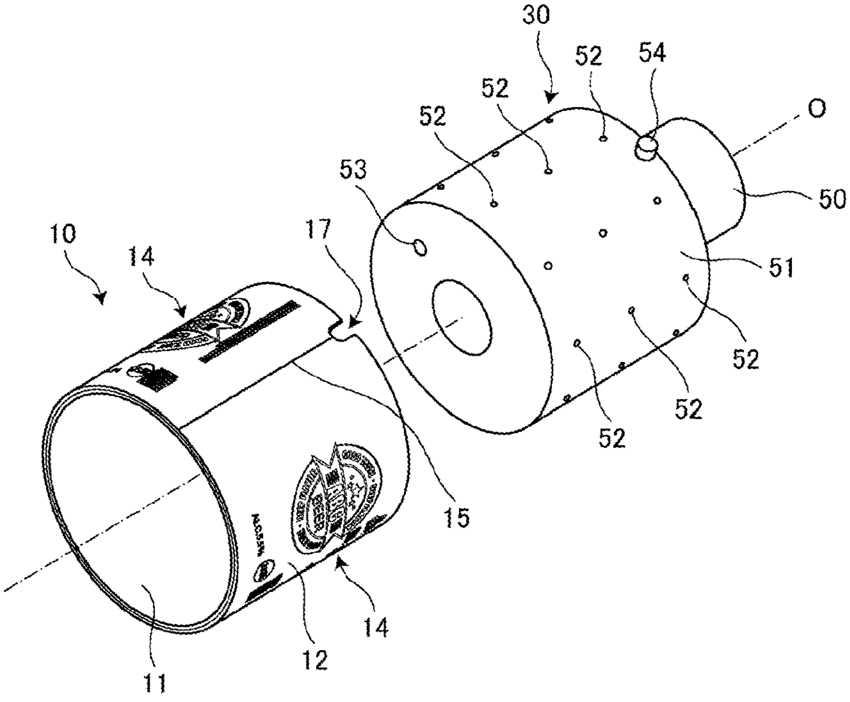
FIG. 5 is an explanatory view showing the structure of a part of the printing device which uses the sleeve printing plate according to the embodiment.

FIG. 5 is an explanatory view showing the structure of a part of the printing device A which uses the sleeve printing plate 10 according to the embodiment. As shown in FIG. 5, the plate cylinder 30 is formed in a circular columnar shape, and has a cylinder 51 which is rotatably supported by a shaft portion 50 of the offset printing apparatus A in a cantilever state. The sleeve printing plate 10 of this embodiment is fitted on an outer peripheral side of the cylinder 51.

An inner diameter of the sleeve printing plate 10 and an outer diameter of the cylinder 51 are set substantially equal to each other. A plurality of air holes 52 are formed in the outer peripheral surface of the cylinder 51. With such a configuration, by supplying air into the cylinder 51 from an introducing hole 53 formed in an end surface of the cylinder 51 and allowing air to blow off from the air holes 52, the inner diameter of the sleeve printing plate 10 is forcibly expanded so as to enable mounting and removal of the sleeve printing plate 10 on and from the cylinder 51.

A positioning pin 54 is formed on the cylinder 51 in a projecting manner. By making a positioning notched portion 17 formed in the sleeve printing plate 10 engage with the positioning pin 54, the relative positions in the circumferential direction and in the axis O direction between the sleeve printing plate 10 and the cylinder 51 are determined.

In the offset printing apparatus A on which the sleeve printing plate 10 is disposed, respective inks of different colors are supplied from the ink sources 22 of the respective inker units 21. Then, the inks are made to adhere to the image patterns 14, 14 of the sleeve printing plates 10 arranged on the outer peripheral surfaces of the plate cylinders 30 by way of the ducting rolls 23, the intermediate rollers 24 and the rubber rollers 25. Then, the respective inks of different colors are transferred to the blankets 29 on the rotating blanket wheel 28 as the image patterns 14, 14, and these image patterns 14, 14 are brought into contact with and are printed on the can barrel 40 held by the mandrel 31.

In this manner, the sleeve printing plate of the present invention is configured to be used as the sleeve plating plate 10 which can print characters and image patterns on a can barrel in the offset printing apparatus A.

The sleeve printing plate 10 manufactured by the manufacturing method can be used in the offset printing apparatus A in a state where chippings and defects of the printed relief 13 can be reduced as much as possible by manufacturing the sleeve printing plate 10 through the above-mentioned manufacturing steps. Accordingly, it is possible to acquire extremely fine printing on the can barrel 40.

While several embodiments of the present invention have been described in detail with reference to drawings, these embodiments are provided for an exemplifying purpose. The present invention can be carried out in other modes to which various modifications and improvements are applied based on knowledges of those who are skilled in the art including the modes described in the disclosure of the present invention.

REFERENCE SIGNS LIST

A: offset printing apparatus
S102: step of irradiating ultraviolet ray
S103: step of washing and cooling with water
S104: step of applying heating treatment
S105: step of performing heat dissipation treatment
10: sleeve printing plate
11: sleeve body
12: printing plate (photosensitive resin)
13: printed relief
14: image pattern

The invention claimed is:

1. A method for manufacturing a sleeve printing plate, the method comprising:

washing and cooling a printing plate made of a photosensitive resin with water after the printing plate is subjected to an irradiation of an ultraviolet ray, wherein the printing plate is a sheet-shaped plate;

applying a heating treatment to the printing plate by a hot air in an oven at a temperature of 135 to 170° C. after the washing and cooling;

applying a heat dissipation treatment to the printing plate after the heating treatment;

disposing the printing plate to surround an outer peripheral surface of a circular cylindrical sleeve body; and forming an image pattern on the printing plate disposed on the circular cylindrical sleeve body by laser engraving, wherein the heating treatment and the heat dissipation treatment are performed while holding the printing plate in a circular cylindrical shape having a diameter approximately equal to a diameter of the printing plate in a state where the printing plate is mounted on a laser engraving device or a printing device, and wherein the laser engraving is carried out after the washing and cooling, the heating treatment, and the heat dissipation treatment.

2. The method for manufacturing the sleeve printing plate according to claim 1, further comprising:

removing a periphery of the printing plate after the heating treatment and the heat dissipation treatment.

3. The method for manufacturing the sleeve printing plate according to claim 1, wherein the heat dissipation is carried out for 5 to 120 minutes.

4. The method for manufacturing the sleeve printing plate according to claim 1, further comprising:

forming a notched portion of the sleeve printing plate, wherein the notched portion of the sleeve printing plate has a shape substantially the same as a notched portion in the sleeve body, and the notched portion of the sleeve printing plate is formed at a joining portion.

5. A method for manufacturing a sleeve printing plate, comprising:

forming a printing plate made of a photosensitive resin into a circular cylindrical shape and subjecting the printing plate to an irradiation of an ultraviolet ray so as to cure the photosensitive resin;

washing and cooling the printing plate with water after the irradiation of the ultraviolet ray;

applying a heating treatment to the printing plate by a hot air in an oven at a temperature of 135 to 170° C. after the washing and cooling;

applying a heat dissipation treatment to the printing plate after the heating treatment;

disposing the printing plate to surround an outer peripheral surface of a circular cylindrical sleeve body; and forming an image pattern on the printing plate disposed on the circular cylindrical sleeve body by laser engraving, wherein the heating treatment and the heat dissipation treatment are performed while holding the printing plate in the circular cylindrical shape having a diameter approximately equal to a diameter of the printing plate in a state where the printing plate is mounted on a laser engraving device or a printing device, and wherein the laser engraving is carried out after the washing and cooling, the heating treatment, and the heat dissipation treatment.

6. The method for manufacturing the sleeve printing plate according to claim 5, further comprising:

removing a periphery of the printing plate after the heating treatment and the heat dissipation treatment.

* * * * *